United States Patent [19]
Sandelman et al.

[11] Patent Number: 5,643,482
[45] Date of Patent: Jul. 1, 1997

[54] SNOW MELT CONTROL SYSTEM

[75] Inventors: David Sandelman, Chatham; Daniel E. Shprecher, Highland Lakes, both of N.J.

[73] Assignee: Heat timer Corporation, Fairfield, N.J.

[21] Appl. No.: 585,484

[22] Filed: Jan. 16, 1996

[51] Int. Cl.[6] .................................................. H05B 1/02
[52] U.S. Cl. ............................ 219/497; 219/506; 219/494; 219/213; 237/80
[58] Field of Search .............................. 219/208–210, 219/497, 492, 506, 494, 499, 501, 213; 237/69, 80

[56] References Cited

U.S. PATENT DOCUMENTS

| | | | |
|---|---|---|---|
| 3,568,924 | 3/1971 | Chenault | 237/69 |
| 4,167,663 | 9/1979 | Granzow, Jr. et al. | 219/497 |
| 4,638,147 | 1/1987 | Dytch et al. | 219/308 |
| 4,868,368 | 9/1989 | Araki | 219/216 |
| 4,948,950 | 8/1990 | Rae | 219/497 |
| 5,022,459 | 6/1991 | Chiles et al. | 165/11.1 |

*Primary Examiner*—Mark H. Paschall
*Attorney, Agent, or Firm*—Levisohn, Lerner, Berger & Langsam

[57] ABSTRACT

A snow and ice melt control system is provided to melt snow and ice from a slab, a temperature sensor means are provided at the input and output from the slab, and a differential temperature is generated reflecting the condition of the slab in respect to the ambient temperature. A controller is provided to adjust the amount of heat and heated fluid flowing to the slab to actively respond to environmental conditions to more efficiently melt snow and ice on the slab.

16 Claims, 6 Drawing Sheets

SNOW MELT CONTROL SYSTEM

BACKGROUND OF THE INVENTION

Snow melt systems are installed in areas where unwanted snow and ice are eliminated by heating the surface to a temperature above freezing. These areas include sidewalks, stairways, driveways, runways, parking lots, wheelchair ramps, football fields, dog tracks, etc. Two methods are used to heat the surface. One (Electric) involves the installation of resistive wire under the surface and passing an electrical current through the wires causing the wire to heat and thereby heating the surface. The second (Hydronic) method which is more common, uses tubing placed beneath the surface with a heated liquid pumped through. This liquid is usually water with an antifreeze additive.

At present there are four levels of control used for the start and stop function and the temperature control of the fluid. The most basic form of control uses an on/off switch that is manually switched on before it begins to snow, and is manually turned off after the snow fall has ended and the area to be cleared, is free of ice and snow. The second and slightly more sophisticated control uses a wind-up timer. The operator does not have to remember to turn off the system, but still needs to turn it on before the snow fall, and may need to wind the timer a second or third time if the area still has a snow or ice accumulation at the end of the first time interval. The third level of control uses a moisture and temperature sensor located in the area of the snow melt surface, but not in contact with the surface. It waits for two conditions to be true, its moisture sensor has detected moisture and the outdoor temperature is below a predetermined setting, typically 38 degrees Fahrenheit. When both conditions are true, its output turns on to start the snowmelt system. When one of the conditions are no longer true, the output remains active for some predetermined amount of time. The fourth and most elaborate system uses a moisture and temperature sensor that is located directly in the snow melt area. The objective of this system is to directly experience moisture and temperature as the snow melt area does. This control system is the most expensive and is affected by the location of the sensor in the slab.

OBJECTS OF THE INVENTION

An object of the present invention is to provide an improved snowmelt system which is economical in use and effective in eliminating unwanted snow and ice.

Another object of the present invention is to provide such a snowmelt system which automatically operates with minimal user interface and maximizes efficiency of use of heat energy to eliminate unwanted snow and ice.

Yet another object of this invention is to provide such a system which employs modern computer software techniques so that specific needs of specific customers may be able to be customized by adjusting the software to whatever customer needs may be apparent.

Another object of this invention is to provide such a system which is rugged, susceptible of widespread use and is economical.

Still another object of this invention is to provide such a snowmelt system which has its controls carried in a compact and efficient housing easily used by customers.

Other objects, advances and features of this invention will become apparent from the following description.

SUMMARY OF THE INVENTION

The invention has applications in Hydronic systems only. It is a control system that uses outdoor temperature, fluid supply temperature and fluid return temperature of the heated area, also known as the slab. By monitoring the supply and return fluid temperatures of the slab in response to a rate of change of outdoor air temperature, it can be determined whether heat energy is being lost to the atmosphere from a dry slab, or heat is being used to melt snow or ice and evaporate the water into the atmosphere.

DETAILED DESCRIPTION OF THE DRAWING

Figure 1:
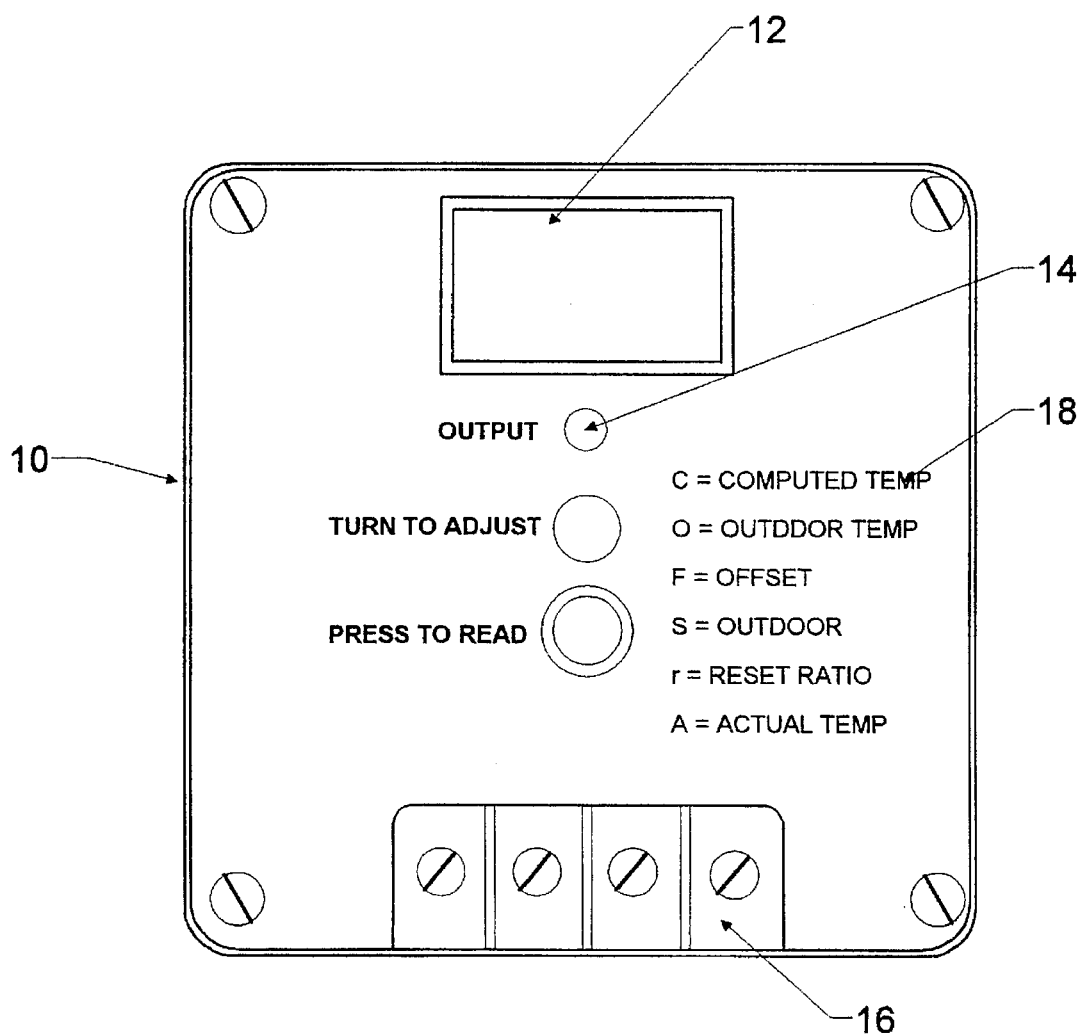
FIG. 1 is a perspective view of the housing for the control system of the present invention which is available to the user and provides convenient settings, connections, displays and controls.

FIG. 1 is a perspective view of the housing 10 for the residential snow and ice melt control system. As shown, the housing is small and rectangular in shape and comprises a display window 12, a manual rotary adjust 14, electrical connections 16 and display information 18. The display 12 may be an light emitting LED display which displays outside air temperature, slab supply temperature, slab return temperature, actual system $\Delta T$, slab design $\Delta T$, a maximum slab supply temperature.

Figure 2:
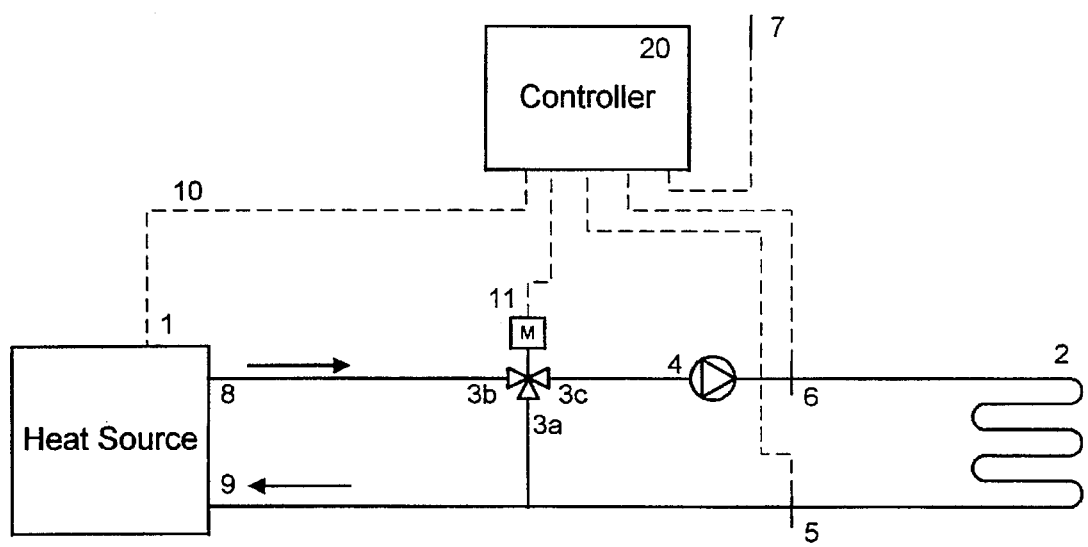
FIG. 2 is a block diagram of the snow and ice melt control system of this invention.

FIG. 2 illustrates a heat source 1 which is controlled by controller 20 to produce heat as required by controller 20. Heat source 1 has an output 8 connected to a valve 3 which has a heat source port 3b, a lower port 3a and a common port 3c. Lower port 3a is connected at its input to the return 9 of heat source 1, while the common valve control is connected to a motor M through line 11 which is connected to and receives control signals from controller 20. Motor M automatically controls valve ports 3a, 3b and 3c. Common valve port 3c is also connected to a pump 4 which is also activated by system start/stop function. Fluid emitted by pump 4 passes through a supply temperature sensor 6 to the slab 2, and through a return temperature sensor 5 to the common return 9 for heat source 1. Additionally, the fluid passing through return temperature sensor 5 also passes through to the lower port 3a of valve 3. A thermistor 7 which monitors outdoor temperature is connected to controller 20.

Figure 3:
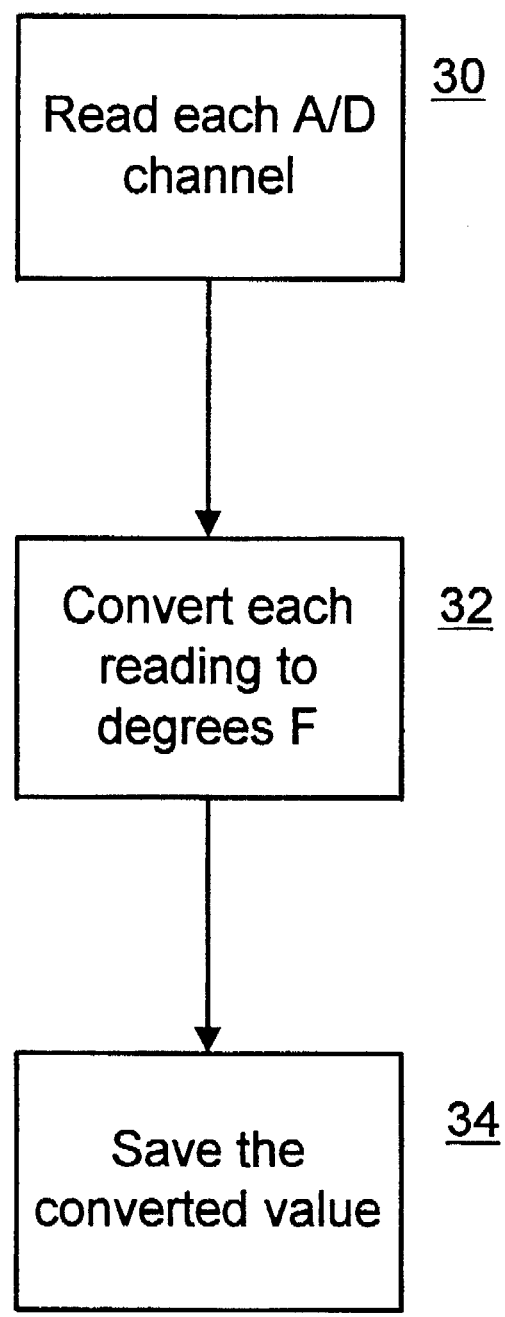
FIG. 3 is another block diagram illustrating functional operations of various portions of the present snow and ice melt control system.

FIG. 3 is flow chart for the controller 20 to convert each sensed temperature which is supplied in analog form to a digital signal to be able to produce the displayed temperature in display 12 in housing 10. In particular, the controller comprises a means to read each channel 30, the output of which is supplied to means 32 to convert each reading to degrees fahrenheit, the output of which is saved as the converted value 34 in degrees fahrenheit for display purposes. Although one such flow chart is illustrated, that flow chart can be used for any conversion of temperature from analog to digital form.

Figure 4:
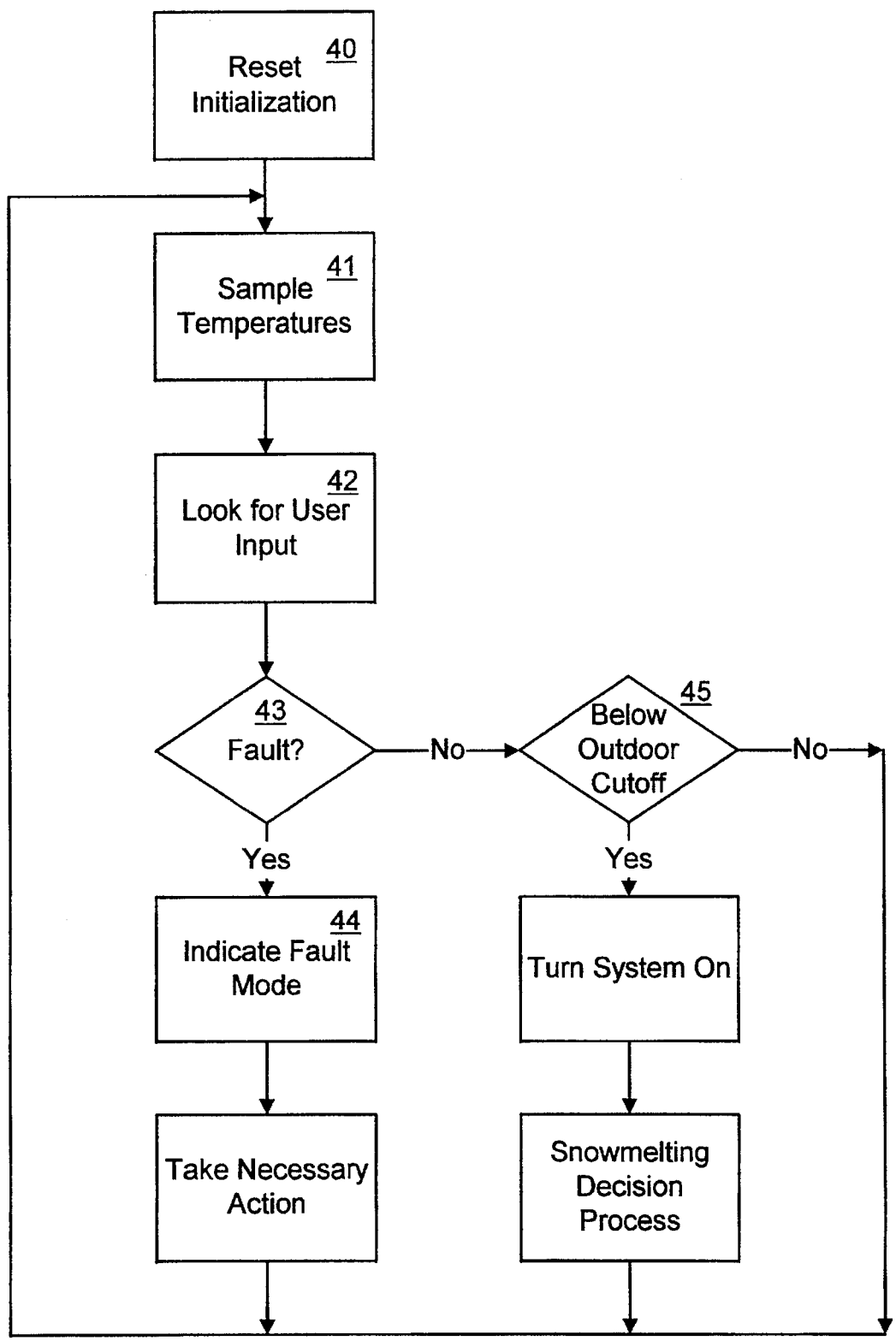
FIG. 4 is flow chart relating to a display in the present invention.

FIG. 4 is a flow chart of the controller to turn the system on. The initial conditions of the residential snow and ice melt control system are reset as in box 40. The controller samples the temperature of the outdoor sensor in sample means 41, the temperature of the supply slab supply sensor and the temperature slab return sensor. Those temperatures are supplied to the user input 9a to determine if the system is intended to be in operation. If a fault is indicated in 43, the YES path is activated which indicates the fault mode 44 which then displays or otherwise provides information as to what action is to be taken to correct the fault as in 43. If there is no fault, the system queries in box 45 whether or not the ambient outdoor temperature is below the cutoff temperature. If the answer is NO, the system is not activated, whereas if the answer is YES, the system is turned on at 46 and the snow melting decision making process is instigated as at 47. The snow melting decision making process includes the return of sample temperatures to the sample temperature box 41 for automatically repeating the operation.

Figure 5:
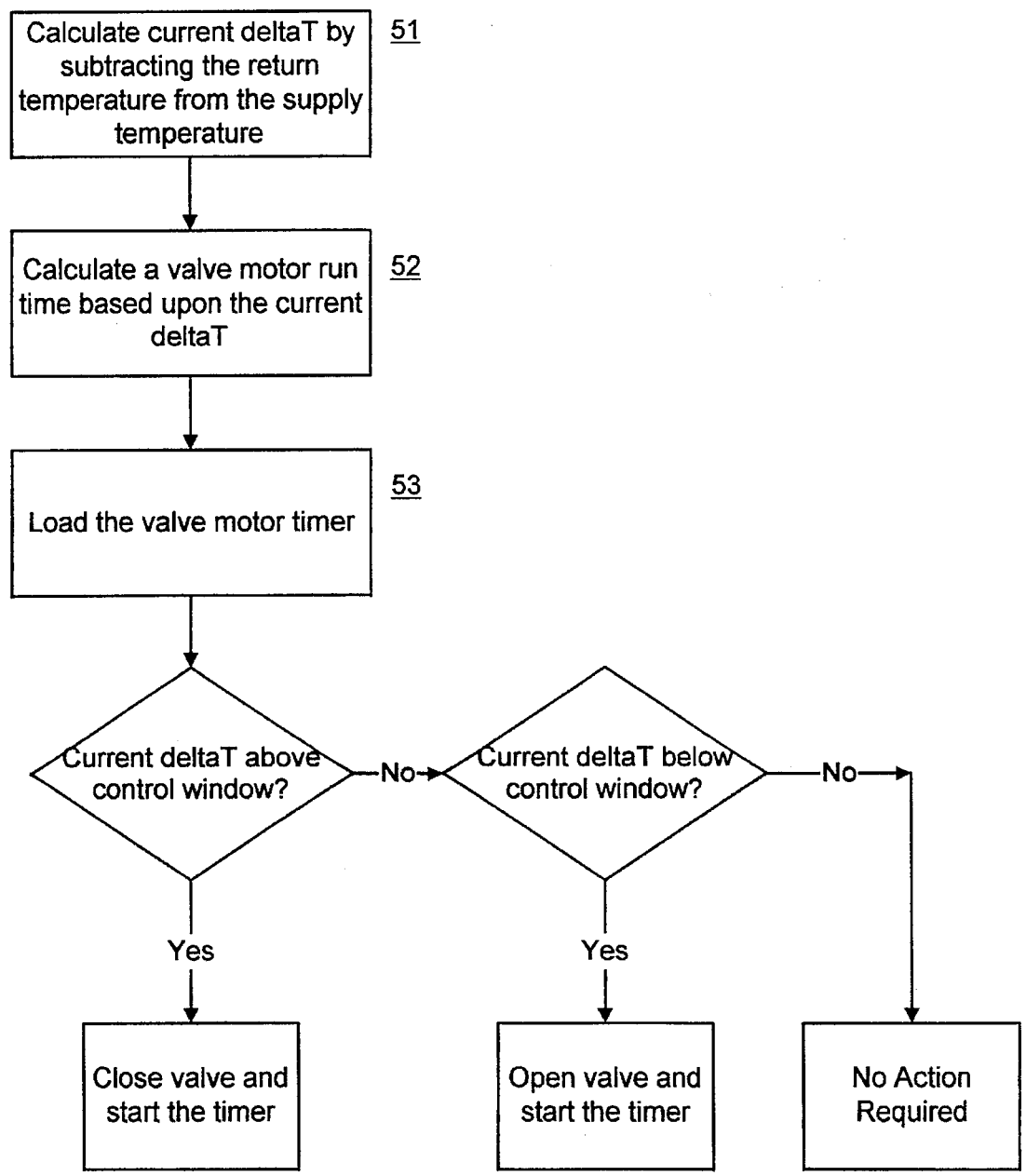
FIG. 5 is flow chart relating to controlling the source of heat which is used to melt ice and snow.

FIG. 5 illustrates a flow chart for controlling the Motor M and valve 3. In box 51, the controller calculates the current $\Delta T$ by subtracting the return temperature from the supply temperature. A valve motor run time is calculated based on the current $\Delta T$ as in box 52. The valve motor timer is loaded (53) according to the calculation as in box 52. A determination is made as to whether or not the $\Delta T$ is above what is shown in the control window so as to activate the system. If the current $\Delta T$ is above the control window value, the valve 3 is closed, and the timer (M) is started. If the current $\Delta T$ is below the temperature in the control window, another query is made to determine whether or not the current $\Delta T$ is below the control window. If the answer is no, no action is required, whereas if the answer is yes, the valve is opened and the timer is started.

Figure 6:
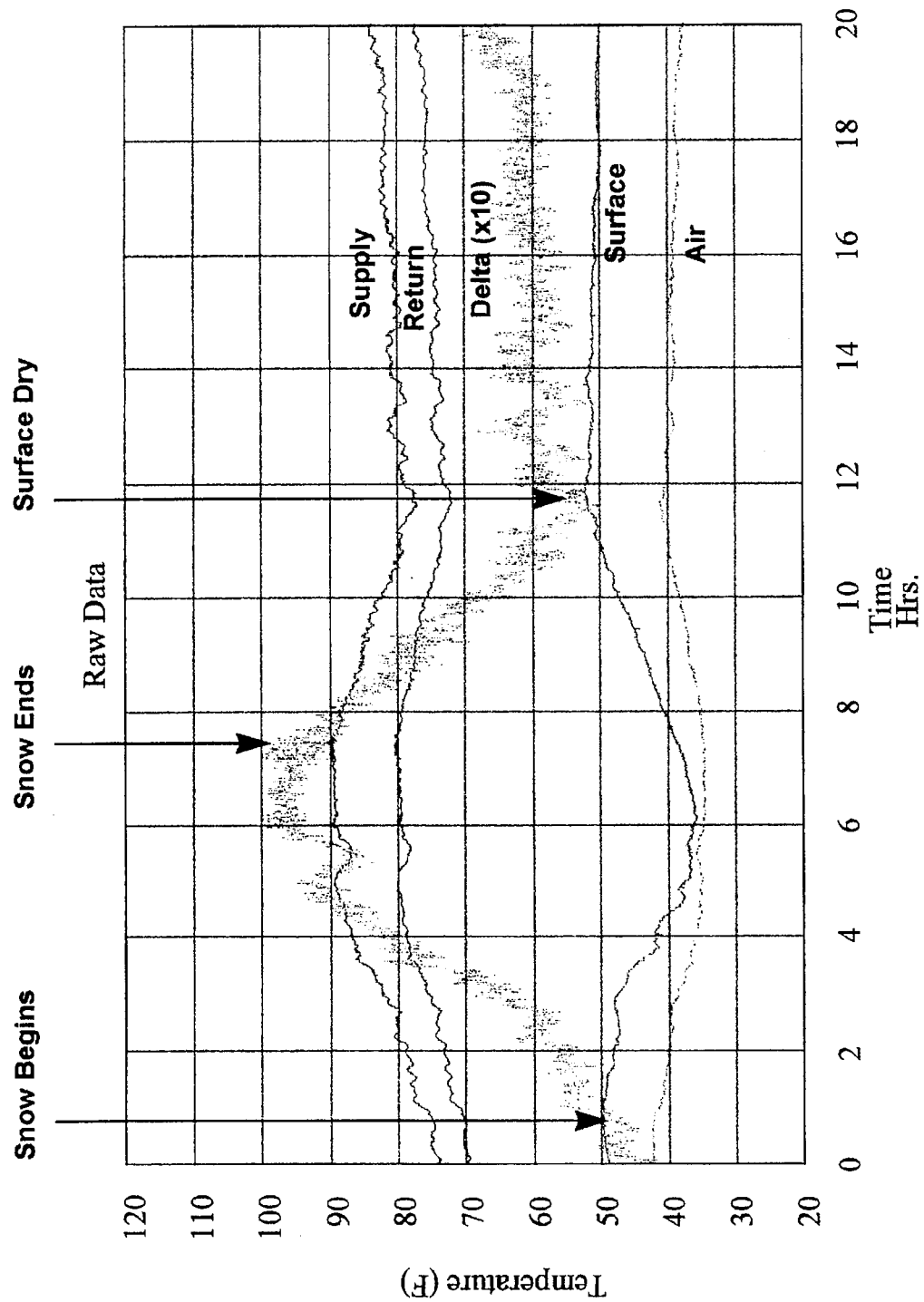
FIG. 6 is a graph that shows the supply, return, outside air and surface temperatures of a slab during a snow fall.

FIG. 6 shows the supply, return, outside air and surface temperatures of a concrete slab during a snow fall. An amplification of the $\Delta T$ (supply temperature minus return temperature times 10) clearly shows the profile of the snow event and drying of the slab. This demonstrates that an actual snow sensor may not be required in the slab, and that the entire slab can be used as the snow sensor.

The controller monitors outdoor ambient temperature by means of thermistor 7 located in the outside air in the area of the slab 2 to be controlled. When the outside air drops to a predetermined temperature (the system starter, 40° F. typical), the controller 20 activates the heat source 1) by means of a conventional switch contact closure located in the controller that is connected to the system start/stop input 10. The pump 4 is also activated by the system start/stop function.

The pump creates a flow of fluid that flows past the supply temperature sensor 6, the slab 2, the return temperature sensor 5, the lower port of valve 3a, the common port of the valve and back to the pump 4. At this time, no fluid passes into the heat source or out of the heat source 8, thereby no heat is transferred to the slab.

As the outside air temperature drops, the controller 20 positions the valve 3 so that a controlled amount of water can pass through the heat source and mix in the valve via the heat source port 3b in order to raise the fluid temperature leaving the valve 3c. The controller continually monitors the supply 6 and return sensors 5 and calculates the temperature difference, $\Delta T$. As the outside air temperature drops, the control looks for a correlated increase in $\Delta T$ across the slab and increases the amount of heat to the slab by adjusting the valve 3 to increase the flow from the heat source through the heat source port of the valve 3b. As the air temperature increases outside, the control reduces the flow through the heat source port 3b, thereby reducing the amount of heat delivered to the slab. When the outside air temperature rises above the outdoor cutoff temperature, the heat source is deactivated and the pump is stopped.

When the slab is actively melting snow and evaporating water, the $\Delta T$ across the slab will rise at a faster rate than the outside temperature falls. This also causes the controller to increase the amount of heat delivered to the slab.

This invention has been described with a preferred embodiment. Other variations and modifications may be made which will still come within the patent's protection as set forth in the appended claims.

We claim:

1. A snow and ice melt control system for use with a slab to melt ice and snow from the slab, control system comprising:

a slab supply for supply fluid to said slab, a slab return for carrying fluid away from said slab after said fluid passes through said slab, said slab exposed to ambient outdoor weather conditions, temperature differential means to determine the temperature difference of the fluid supplied by the slab supply and the fluid returning from the slab, said temperature difference related to the ambient outdoor weather conditions, a controller connected to said temperature differential means to generate command signals responsive to the temperature differences between the supply and return fluids.

2. A system as set forth in claim 1, further comprising slab temperature sensor means connected at said slab supply to provide information concerning the temperature at said slab supply, slab temperature sensor means connected at said slab return to provide information concerning the temperature of the fluid as it exits from said slab, said slab supply temperature sensor means and said slab return temperature sensor means connected to said controller.

3. A system as set forth in claim 1, further comprising ambient temperature sensor means to sense the temperature in the air, said ambient temperature sensor means connected to said controller.

4. A system as set forth in claim 1, further comprising a heat source for heating said fluid to be supplied to said slab supply, said heat source connected to said slab return, said heat source controlled by said controller.

5. A system as set forth in claim 1, further comprising a slab pump connected to said controller to be turned on or turned off according to certain conditions sensed in said controller, a controllable valve connected to said controller to control the amount to fluid heated by said heat source and supplied to said slab through said slab supply.

6. A system as set forth in claim 5, wherein said controllable valve is controlled by a motor and said motor is controlled by said controller.

7. A system as set forth in claim 1, wherein said controller comprises means to determine the rate of change of the temperature difference between the slab supply and slab return sensors.

8. A system as set forth in claim 5, wherein the heat source and control valve are controllable to adjust the maximum slab supply temperature.

9. A system as set forth in claim 1, further comprising a housing for said controller, wherein said housing is mountable to be easily viewed.

10. A system as set forth in claim 9, wherein said housing comprises a display window of displaying a variety of temperature conditions occurring at a variety of temperature sensors.

11. A system as set forth in claim 1, wherein said controller comprises a programmable computer.

12. A system as set forth in claim 1, wherein said fluid is a liquid.

13. A system as set forth in claim 12, wherein said liquid is a combination of water and antifreeze additive.

14. A system as set forth in claim 12, wherein said liquid is water.

15. A system as set forth in claim 3, wherein said controller comprises means to determine when the ambient air drops to a predetermined temperature, said controller comprising command signals to activate the heat source and said system.

16. A system as set forth in claim 5, wherein said conditions are adjustable by the user.

* * * * *